(12) United States Patent
Kataoka et al.

(10) Patent No.: US 7,187,630 B2
(45) Date of Patent: Mar. 6, 2007

(54) FOCUSING SERVO DEVICE AND FOCUSING SERVO METHOD

(75) Inventors: Masanobu Kataoka, Miyazaki (JP);
Kiichiro Nemoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 362 days.

(21) Appl. No.: 10/164,373

(22) Filed: Jun. 10, 2002

(65) Prior Publication Data

US 2002/0191503 A1    Dec. 19, 2002

(30) Foreign Application Priority Data

Jun. 11, 2001 (JP) .............................. 2001-175751
Oct. 11, 2001 (JP) .............................. 2001-314268

(51) Int. Cl.
*G11B 7/08* (2006.01)

(52) U.S. Cl. ................................. 369/44.27; 369/53.28

(58) Field of Classification Search ............. 369/44.27, 369/43, 53.28
See application file for complete search history.

(56) References Cited

U.S. PATENT DOCUMENTS

| 4,615,023 A | * | 9/1986 | Inada et al. | ............... | 369/30.15 |
| 4,956,832 A | * | 9/1990 | Miyasaka | ................ | 369/44.11 |
| 5,077,719 A | * | 12/1991 | Yanagi et al. | ............ | 369/44.13 |
| 5,109,367 A | * | 4/1992 | Yoshikawa | ............... | 369/44.25 |
| 5,475,209 A | * | 12/1995 | Nabeshima | .............. | 250/201.4 |
| 6,154,425 A | * | 11/2000 | Iida et al. | ................. | 369/44.29 |
| 6,564,009 B2 | * | 5/2003 | Owa et al. | .................. | 386/126 |
| 6,603,717 B1 | * | 8/2003 | Kawada et al. | .......... | 369/44.29 |
| 6,747,924 B1 | * | 6/2004 | Muramatsu | .............. | 369/44.29 |
| 2004/0021951 A1 | * | 2/2004 | Maeda et al. | ................ | 359/643 |

FOREIGN PATENT DOCUMENTS

| JP | H02-130729 A | 5/1990 |
| JP | H03-110406 A | 5/1991 |
| JP | H03-165324 A | 7/1991 |
| JP | H04-289521 A | 10/1992 |
| JP | H05-157958 A | 6/1993 |
| JP | 05-290400 | 11/1993 |
| JP | A 7-103710 | 4/1995 |
| JP | A 07-129968 | 5/1995 |
| JP | A 7-294800 | 11/1995 |
| JP | A 9-68407 | 3/1997 |
| JP | 11-066575 | 3/1999 |
| JP | A 11-120569 | 4/1999 |
| JP | 11-306551 | 11/1999 |
| JP | A 2000-1559532 | 6/2000 |
| JP | A 2000-348354 | 12/2000 |

* cited by examiner

*Primary Examiner*—Andrea Wellington
*Assistant Examiner*—M. V. Battaglia
(74) *Attorney, Agent, or Firm*—Oliff & Berridge, PLC

(57) ABSTRACT

A focal detecting means (35) of a controller (25) controls an actuator driver (38) to actuate an actuator (12) to vibrate an objective lens (3) in a direction along an optical axis. An output of a focus error signal from a signal generator (27) is checked by a signal detecting means (46) and presence of a workpiece is determined when the signal is detected. When the presence of the workpiece is detected, the focal detecting means (35) moves the objective lens (3) along the optical axis by the actuator (12) and a focus position is recognized with reference to a position signal from a position detecting means (49) together with the focus error signal, where the objective lens (3) is moved to the focus position for focusing.

7 Claims, 13 Drawing Sheets

FOCUSING SERVO DEVICE AND FOCUSING SERVO METHOD

BACKGROUND OF THE INVENTION

1. Field of the Invention

The present invention relates to a focusing servo method for moving an objective lens to a focus position based on focus error signal and a device therefore.

2. Description of Related Art

Conventionally, it is known to provide a focusing servo device to an optical displacement gauge for detecting focus by reflected light obtained by irradiating laser beam. Examples of such focusing servo device are disclosed in Japanese Laid-Open Publications Hei 7-103710, Hei 7-294800 and Hei 9-68407.

The focusing servo device disclosed in the Japanese Laid-Open Publications Hei 7-103710, Hei 7-294800 and Hei 9-68407 has an objective lens moved toward and away from measurement surface and detects zero-cross point of S-curve signal generated by converting reflected light into an electric signal by the movement of the objective lens, so-called focus error signal, as a focus point. The objective lens is moved to the detected zero-cross point position by driving an actuator by outputting signal from CPU (Central Processing Unit) to obtain precise focus.

In the above-described conventional focusing servo device, the time from detection of the zero-cross point to movement of the objective lens to the focus position as the zero-cross point position depends on response characteristics of command transmission of control process of control system, in which the waveform of the focus error signal generated from the reflected light satisfies the condition of focusing area and the objective lens is moved under control of CPU. In the control process, mechanical component such as actuator and movement mechanism for moving objective lens by driving the actuator are provided. Accordingly, in order to prevent delayed or excessive movement of the objective lens relative to command signal in transmitting the command of the control system, feedback control is conducted while checking the current position of the objective lens.

However, since the conventional focusing servo device conducts feedback control while checking the current position of the objective lens, it takes much time before completing focusing on account of delay in command transmission, i.e. the time required for transmitting the command, in the control system, which hinders improvement in work efficiency.

On the other hand, knife-edge method and pinhole method are used for detecting the convergent reflected light for detecting the focus error signal in the above focusing servo device.

In the knife-edge method, the obtained focus error signal can be detected when the objective lens is shifted relative to actual focus position as shown in FIG. 17. Accordingly, the focus position can be recognized based on the focus error signal even if the objective lens is shifted from the focus position to a degree.

On the other band, the pinhole method has greater peak value of curve waveform of the focus signal and superior S/N ratio, i.e. small noise. Accordingly, the quality of focus error signal is better than the knife-edge method and focus can be precisely adjusted.

However, since the width of waveform of the focus error signal is narrow and the focus error signal cannot be detected when the position of the objective lens is shifted from the focus position to a degree, the measurement surface cannot be recognized and focusing process is not conducted.

Accordingly, in order to use the pinhole method, additional step such as control by an operator for detecting focus error signal by operating a switch etc. is required, so that process automation cannot be achieved and focusing process can be complicated.

SUMMARY OF THE INVENTION

An object of the present invention is to reduce the time before the end of focusing in focusing servo process.

A focusing servo device according to an aspect of the present invention includes: a driver for moving an objective lens along the optical axis of the objective lens, the objective lens irradiating a light beam onto a measurement surface and receives reflected light reflected by the measurement surface; a plurality of photo detectors mutually opposed on both sides of the optical axis of the objective lens as a symmetry axis for respectively detecting the reflected light from the objective lens; a position-shift detecting means for outputting a focus error signal indicating position shift of the objective lens from a focus position based on the reflected light respectively detected by the plurality of photo detectors; a position detecting means for detecting the position of the objective lens moved by the driver; and a focal detecting means for recognizing the focus position based on the focus error signal from the position-shift detecting means and the position of the objective lens detected by the position detecting means and for actuating the driver to move the objective lens to the focus position.

According to the above aspect of the present invention, the focus position is detected by the focal detecting means based on: the focus error signal indicating the position shift of the objective lens relative to the focus position based on the reflected light received by the objective lens after being reflected by the measurement surface; and the position of the objective lens detected by the position detecting means, and the objective lens is moved to the focus position by controllably actuating the driver. Accordingly, the position of the objective lens is recognized in the focus position by detecting the focus error signal and it is only necessary to move the objective lens to the focus position after the focus position is detected, so that feedback control while checking the position of the objective lens is not necessary in moving the objective lens to the focus position as in the conventional arrangement and the objective lens can be moved at a high speed, thereby moving the objective lens within a short time and enhancing operation efficiency.

In the above-described aspect of the present invention, the focal detecting means may preferably move the objective lens to a position most adjacent to the measurement surface and to a position most remote from the measurement surface to detect a movable range of the objective lens, and the focus error signal may preferably be detected by the position-shift detecting means while checking the position of the objective lens within the movable range of the objective lens to detect the focus position by associating the position of the objective lens with the focus error signal.

According to the above arrangement, the objective lens is moved by the focal detecting means to a position most adjacent to the measurement surface and to a position most remote from the measurement surface to detect a movable range of the objective lens, and the focus error signal is detected by the position-shift detecting means while checking the position of the objective lens within the movable range of the objective lens to detect the focus position by associating the position of the objective lens with the focus error signal. Accordingly, the focus position can be easily and accurately detected.

Another object of the present invention is to provide a focusing servo method capable of easily detecting the focus position and conducting efficient focusing and device therefore.

A focusing servo device according to another aspect of the present invention includes: a driver for moving an objective lens along the optical axis of the objective lens, the objective lens irradiating a light beam onto a measurement surface and receives reflected light reflected by the measurement surface; a plurality of photo detectors mutually opposed on both sides of the optical axis of the objective lens as a symmetry axis for respectively detecting the reflected light from the objective lens; a position-shift detecting means for outputting a focus error signal indicating position shift of the objective lens from a focus position based on the reflected light respectively detected by the plurality of photo detectors; and a focal detecting means for controllably actuating the driver to vibrate the objective lens along the optical axis to recognize presence of the focus error signal outputted from the position-shift detecting means and detecting the focus position based on the focus error signal by recognizing the output of the focus error signal.

A focusing servo method according to further aspect of the present invention is derived from the device of the above aspect of the present invention, which includes the steps of: irradiating a light beam onto a measurement surface; receiving a reflected light reflected by the measurement surface through an objective lens; detecting a focus position by detecting a focus error signal indicating deviation of the position of the objective lens relative to the focus position based on the amount of the reflected light; and moving the objective lens to the detected focus position along the optical axis of the objective lens; where the objective lens is vibrated in a direction along the optical axis, and the presence of the focus error signal is recognized while vibrating the objective lens and the focus position is recognized based on the focus error signal when the focus error signal is detected.

According to the above arrangement, the objective lens is vibrated by the driver in a direction along the optical axis and whether the focus error signal indicating position shift of the objective lens relative to a focus position based on the light reflected by the measurement surface and received through the objective lens respectively detected by the plurality of photo detectors is outputted by the position-shift detecting means or not is checked. When the output of the focus error signal is detected, the focus position is recognized based on the detected focus error signal. Accordingly, since the objective lens is positively vibrated to detect the presence of the focus error signal and, after determining the presence of the measurement surface, the focus position is detected, the focus error signal can be easily recognized in a pinhole method having relatively narrow waveform width of the focus error signal and the presence of the measurement surface can be automatically detected. By arranging the objective lens to be vibrated periodically, even when vibration is applied by impact from the outside etc., suspending function for over speed error process etc. is actuated, thus preventing focusing process failure. Since the objective lens is vibrated by the driver for moving the objective lens, no special component for recognizing the presence of the measurement surface is necessary, thus preventing increase in size.

In the present invention, the driver may preferably have an actuator, and the focal detecting means may preferably output a trigger signal to the actuator to vibrate the objective lens in a direction along the optical axis.

According to the above arrangement, since the objective lens is vibrated in a direction along the optical axis using the driver of the objective lens, the structure for vibration can be easily obtained.

In the present invention, the focal detecting means periodically may preferably control the driver to vibrate the objective lens in a direction along the optical axis.

According to the above arrangement, the driver is periodically controlled to vibrate the objective lens in a direction along the optical axis. Accordingly, since the presence of the measurement surface is periodically recognized by detecting the presence of the focus error signal, automatic and efficient focusing is possible for an article automatically conveyed, for instance.

In the present invention, a position detecting means for detecting the position of the objective lens may preferably be provided, and the focal detecting means may preferably control the driver to move the objective lens when the focus error signal outputted by the position-shift detecting means in controllably vibrating the objective lens by the driver is detected, detect the focus position based on the focus error signal from the focus error signal and the position of the objective lens detected by the position detecting means, and move the objective lens to the detected focus position by controllably actuating the driver.

According to the above arrangement, the driver is controlled to move the objective lens when the focus error signal is detected in controllably vibrating the objective lens by the position detecting means, detects the focus position based on the focus error signal from position-shift detecting means and the position of the objective lens detected by the position detecting means, and moves the objective lens to the detected focus position by controllably actuating the driver. Accordingly, the position of the objective lens is detected during the recognizing operation of the focus position by detecting the focus error signal, and the objective lens is moved to the focus position after the focus position is detected based on the position of the objective lens and the focus error signal, there is no need for feedback control for moving the objective lens while checking the position of the objective lens in moving the objective lens to the focus position as in the conventional arrangement. Therefore, after confirming the presence of the measurement surface and recognizing the focus position, the objective lens can be moved at a high speed, so that the objective lens can be moved to the focus position in a short time, thereby enhancing focusing efficiency.

In the present invention, the focal detecting means may preferably move the objective lens to a position most adjacent to the measurement surface and to a position most remote from the measurement surface to detect a movable range of the objective lens, and the focus error signal may preferably be detected by the position-shift detecting means while checking the position of the objective lens within the movable range of the objective lens, the focus position being detected by associating the position of the objective lens with the focus error signal.

According to the above arrangement, the movable range of the objective lens is recognized by moving the objective lens to positions most adjacent to and most away from the measurement surface and the focus error signal is detected by the position-shift detecting means while detecting the position of the objective lens within the movable range of the objective lens, the focus position being detected by associating the position of the objective lens with the focus error signal. Accordingly, the focus position can be easily and accurately detected.

DETAILED DESCRIPTION OF PREFERRED EMBODIMENT(S)

Preferred embodiments of the present invention will be described below with reference to attached drawings.

[Structure of Focusing Servo Device]

Figure 1:
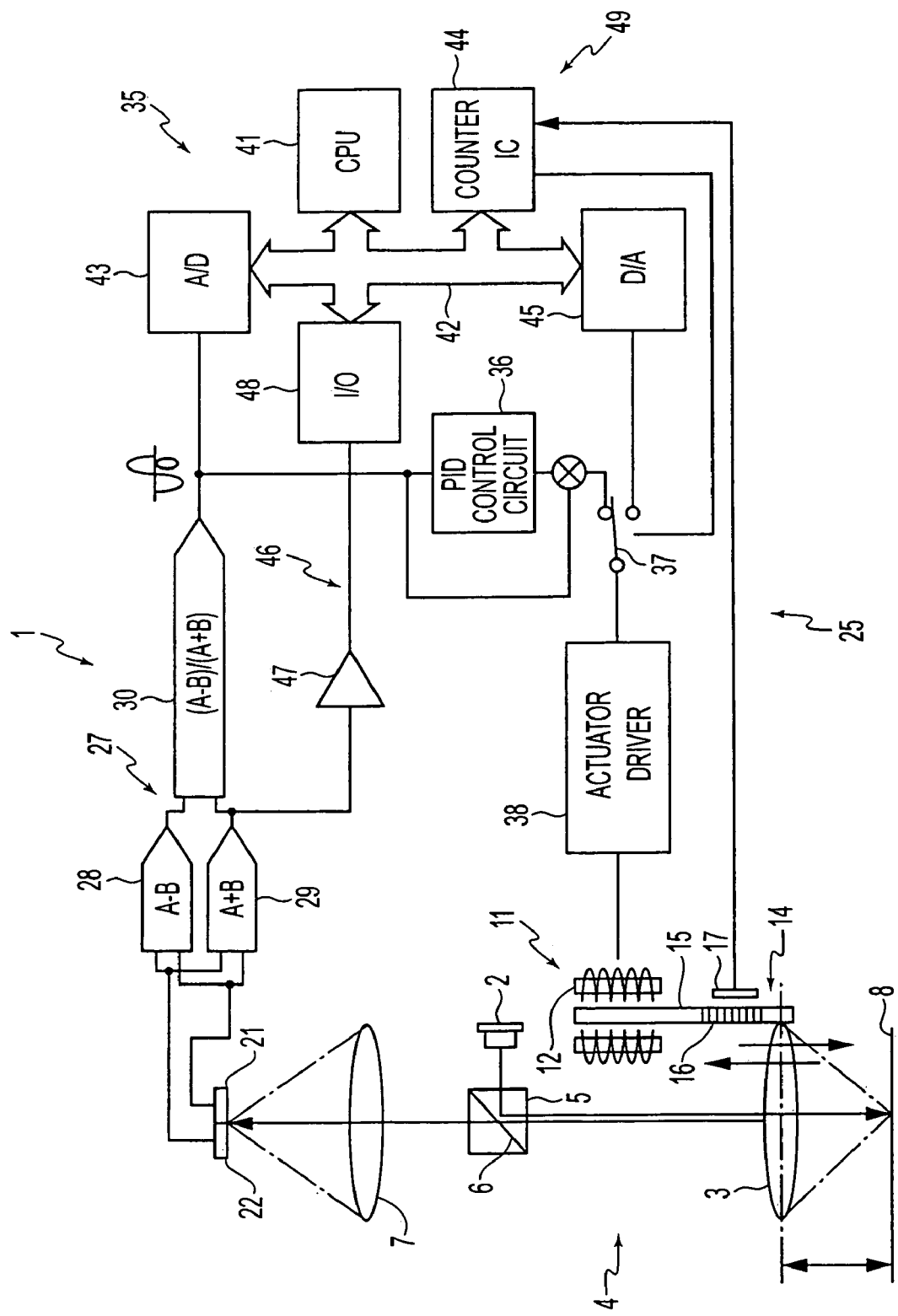
FIG. 1 is a block diagram showing an optical displacement gauge using a focusing servo device according to an embodiment of the present invention.

In FIG. 1, 1 represents an optical displacement gauge, which may be used for controlling tracking movement of a pickup of an optical disc driver and as a measurement head of a surface roughness gauge, the gauge having a casing (not shown). A laser diode 2 as a light source is accommodated in the casing. Further, a pinhole-type optical mechanism 4 having an objective lens 3 is provided in the casing.

A polarization beam splitter 5 disposed in the casing is provided to the optical mechanism 4. The polarization beam splitter 5 reflects a laser light beam irradiated by the laser diode 2.

The optical mechanism 4 further includes a collimating lens (not shown) disposed in the casing between the polarization beam splitter 5 and the objective lens 3. The collimating lens turns the light beam from the polarization beam splitter 5 to a parallel light beam. The polarization beam splitter 5 has a quarter-wave plate 6 on a side opposing the collimating lens. The quarter-wave plate 6 prevents the reflected light reflected by the measurement surface from returning to the laser diode 2 and improves efficiency in combination with the polarization beam splitter 5 as compared to an arrangement using a half-mirror.

An imaging lens 7 as a condensing lens disposed in the casing located opposite to the objective lens 3 of the polarization beam splitter 5 is provided to the optical mechanism 4. The imaging lens 7 images the reflected light passing through the polarization beam splitter 5.

The optical mechanism 4 irradiates the laser light beam irradiated by the laser diode 2 toward a measurement surface 8 and receives the reflected light reflected by the measurement surface 8 by the objective lens 3.

A drive mechanism 11 as a driver for moving the objective lens 3 toward and away from the measurement surface 8 is situated in the casing. The drive mechanism 11 has a holder (not shown) movably provided in the casing. The holder holds the objective lens 3 movably in a direction along optical axis of the objective lens 3, i.e. in vertical direction. The drive mechanism also has an actuator 12 for moving the holder.

Displacement detecting mechanism 14 is provided to the actuator 12. The displacement detecting mechanism 14 has a linear encoder 15 such as a hologram scale. The linear encoder 15 has a scale 16 being moved in accordance with movement of the holder by driving the actuator 12 and a detecting head 17 fixed to the casing for reading the scale 16. The linear encoder 15 detects the graduations on the scale 16 to output a two-phase square wave in accordance therewith.

A pair of first photo detector 21 and second photo detector 22 mutually opposed on both sides of the optical axis of the objective lens 3 are provided in the casing. The first photo detector 21 and the second photo detector 22 are constructed by photodiode etc. and detect the amount of the reflected light sent from the optical mechanism 4. The first photo detector 21 and the second photo detector 22 are located at the focus position of the imaging lens 7.

The drive mechanism 11, the first photo detector 21 and the second photo detector 22 are connected to a controller 25 for controlling the drive of the drive mechanism 11 by recognizing the amount of the light received by the first photo detector 21 and the second photo detector 22.

The controller 25 has a signal generator 27 as a position-shift detecting means for detecting focus error signal S as an S-curve signal. The signal generator 27 has a subtractor 28 and an adder 29 such as an operational amplifier respectively connected to the first photo detector 21 and the second photo detector 22. The subtractor 28 converts the output electric current of the first photo detector 21 and the second photo detector 22 to a voltage to calculate the difference of the converted voltage value (A−B). The adder 29 converts the output electric current of the first photo detector 21 and the second photo detector 22 to a voltage to calculate the sum of the converted voltage value (A+B).

A divider 30 connected to the subtractor 28 and the adder 29 is provided to the signal generator 27. The divider 30 divides the output voltage of the subtractor 28 by the output voltage of the adder 29 ((A−B)/(A+B)) to output focus error signal S.

Figure 2:
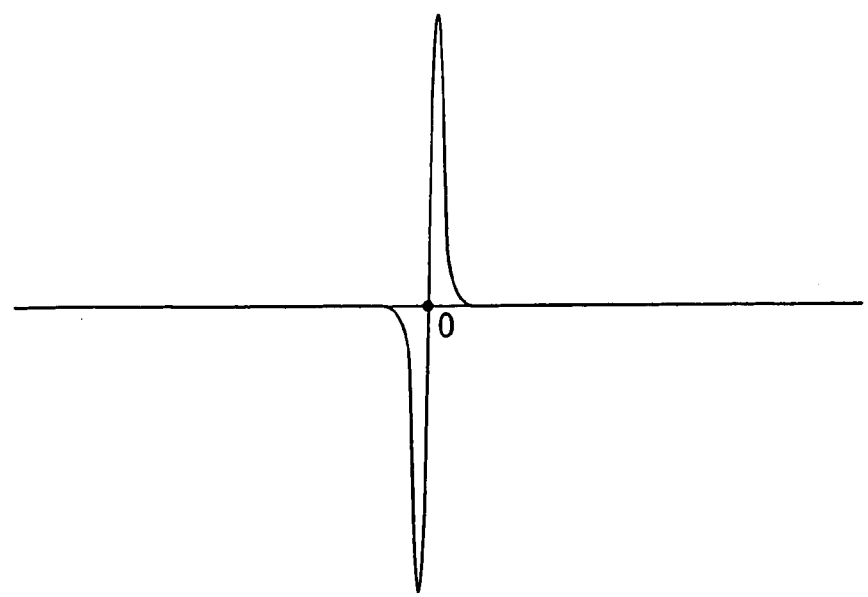
FIG. 2 is a graph showing a focus error signal obtained by the focusing servo device according to the aforesaid embodiment.

As shown in FIG. 2, the focus error signal S becomes 0 when the measurement surface 8 coincides with the focus position of the objective lens 3 and is plus when the measurement surface 8 is nearer than the focus position of the objective lens 3. On the other hand, the focus error signal S is minus when the measurement surface 8 is situated far relative to the focus position of the objective lens 3. Accordingly, the focus error signal S takes substantially S-curve.

The controller has a focal detecting means 35, a PID control circuit 36, and an analog switch 37 for switching the focal detecting means 35 and the PID control circuit 36 and an actuator driver 38 as a movement controller for controlling the drive of the actuator 12.

The focal detecting means 35 is connected to the divider 30 of the signal generator 27 and has a CPU (Central Processing Unit) 41. A data bus 42 is connected to the CPU 41. A/D (Analog/Digital) converter 43, a counter IC 44, a D/A (Digital/Analog) converter 45, and a signal detecting means 46 are connected to the data bus 42.

Figure 3:
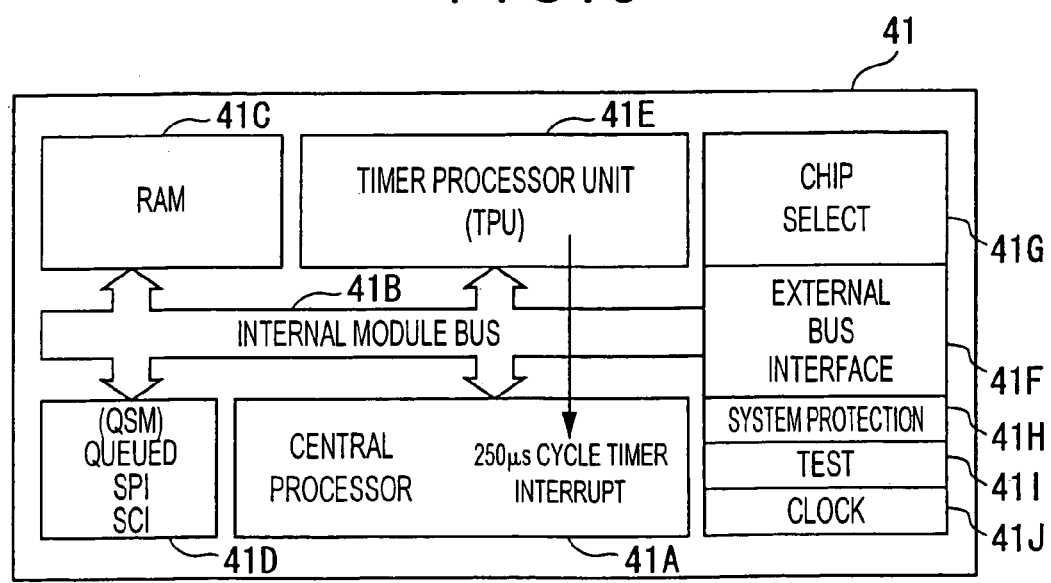
FIG. 3 is a block diagram showing an internal structure of a CPU constituting a focal detecting means of the focusing servo device of the aforesaid embodiment.

As shown in FIG. 3, the CPU has a central processor 41A for processing various signals. An internal module bus 41B is connected to the central processor 41A. RAM (Random Access Memory) 41C, a queue serial module (QSM) 41D, a timer processing unit (TPU) 41E and an external bus interface 41F are connected to the central processor 41A. A chip selector 41G, a system protector 41H, a tester 41I and a clock 41J are provided in the CPU 41.

The external bus interface 41F is connected to the data bus 42 and the internal module bus to transmit and receive the signals.

The RAM 41C temporarily stores the information of the processed signal in a readable manner.

The QSM 41D is a serial communication interface having enhanced queue buffer, which includes, for instance, SPI (SCSI-3 Parallel Interface) and SCI (Scalable Coherent Interface) which is parallel interface having 1 GB/s capacity. The QSM 41D takes in the signal from the outside through the external bus interface 41F through the data bus 42, converts the signal so as to be processed by the CPU 41 and outputs the processed signal after conversion to the data bus 42.

The TPU 41E transmits a signal indicating that a predetermined time, 250 μs for instance, has elapsed to the central processor 41A based on the time counted by the clock functioning as an internal timer.

The chip selector 41G is a device for connecting a plurality of chips such as SDRAM as a memory and switching the chips in accordance with the signal such as chip select signal. The system protector 41H has a trouble shooting function against error of the CPU 41 and the entire controller 25.

The A/D converter 43 shown in FIG. 1 is connected to the divider 30 of the signal generator 27 to convert the focus error signal S into digital signal.

The D/A converter 45 is connected to the actuator driver 38 for controlling the drive of the actuator 12.

The signal detecting means 46 has an S-curve detecting means 47 connected to the adder 29 of the signal generator 27, and an I/O (Input/Output) 48 connected to the S-curve detecting means 47 and the data bus 42. The S-curve detecting means 47 reads the sum component of the voltage value (A+B) from the adder 29 constituting the focus error signal S and converted from the output of the first photo detector 21 and the second photo detector 22. The I/O 48 converts the voltage value read by the S-curve detecting means 47 into a predetermined processable signal. The CPU 41 determines the presence of the measurement surface 8 based on the signal from the I/O 48. Specifically, the CPU 41 determines the presence of the measurement surface 8 when judging that more than a predetermined value of the sum component (A+B) of the voltage value of the focus error signal S is outputted from the curve detecting means 47.

The counter IC 44 is connected to the detecting head 17 of the linear encoder 15 of the displacement detecting mechanism 14. The counter IC 44 counts the two-phase square wave signal outputted by the detecting head 17. The counter IC 44 and the linear encoder 15 construct a position detecting means 49.

The focal detecting means 35 of the controller 25 controls the actuator driver 38 by outputting a predetermined signal by a predetermined cycle by the CPU 41. The actuator driver 38 drives the actuator 12 based on the signal from the CPU 41 so that the objective lens 3 is vibrated in a direction along the optical axis. The focal detecting means 5 detects the presence of the output of the focus error signal S from the position-shift detecting means 27, i.e. the presence of the voltage value sum component (A+B) constituting the focus error signal S by the signal detecting means 46 by the vibration of the objective lens 3.

Figure 4:
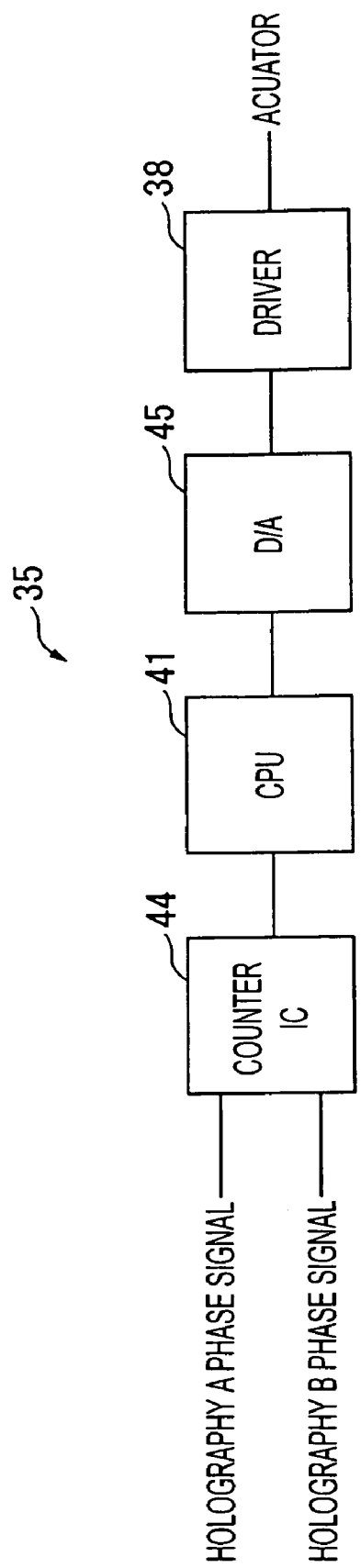
FIG. 4 is a block diagram showing hardware structure of the focal detecting means of the aforesaid embodiment.
Figure 5:
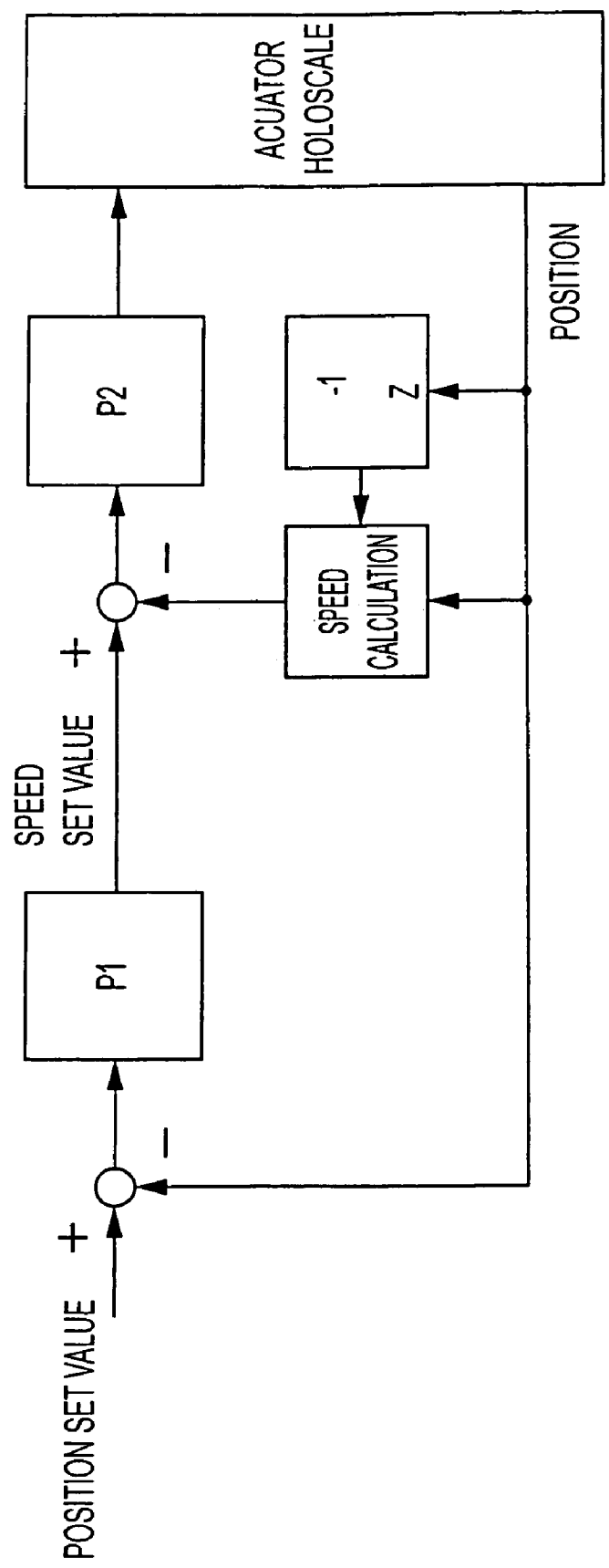
FIG. 5 is a block diagram showing software processing of control step of the focal detecting means of the aforesaid embodiment.

The focal detecting means 35 of the controller 25 detects the voltage value sum component (A+B) constituting the focus error signal by the signal detecting means 46 to determine the focus position. Specifically, as shown in FIGS. 4 and 5, the focal detecting means 35 determines the position of the objective lens 3 based on the two-phase signal from the displacement detecting mechanism 14 by the counter IC 44. The focal detecting means 35 also detects the magnitude of the focus error signal S from the signal generator 27, the positional relationship between the focus error signal S and the objective lens 3, and the zero-cross point position where the focus error signal S is 0.

Figure 6:
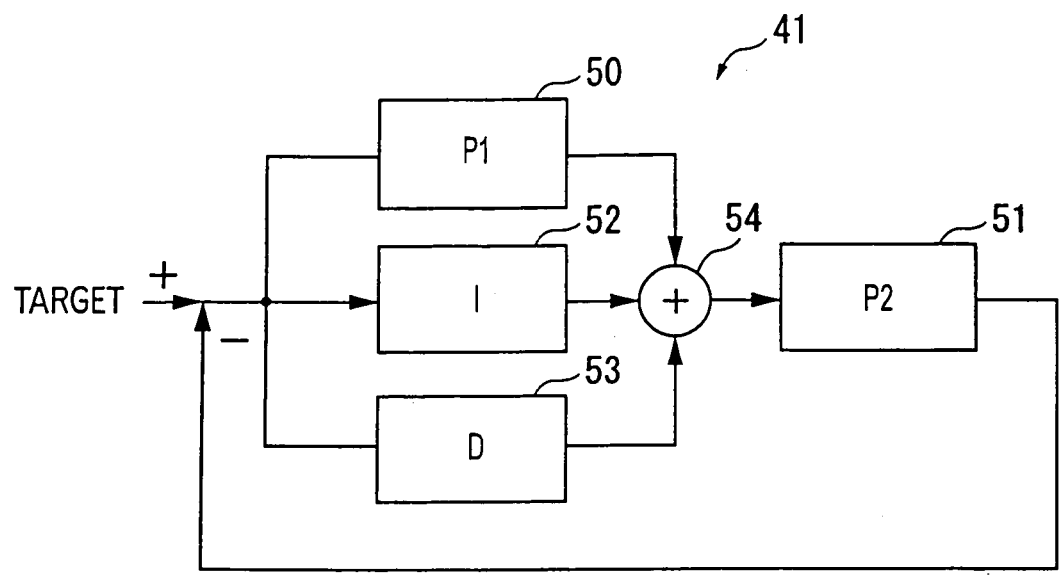
FIG. 6 is a block diagram showing software processing of PID control of the focal detecting means of the aforesaid embodiment.
Figure 7:
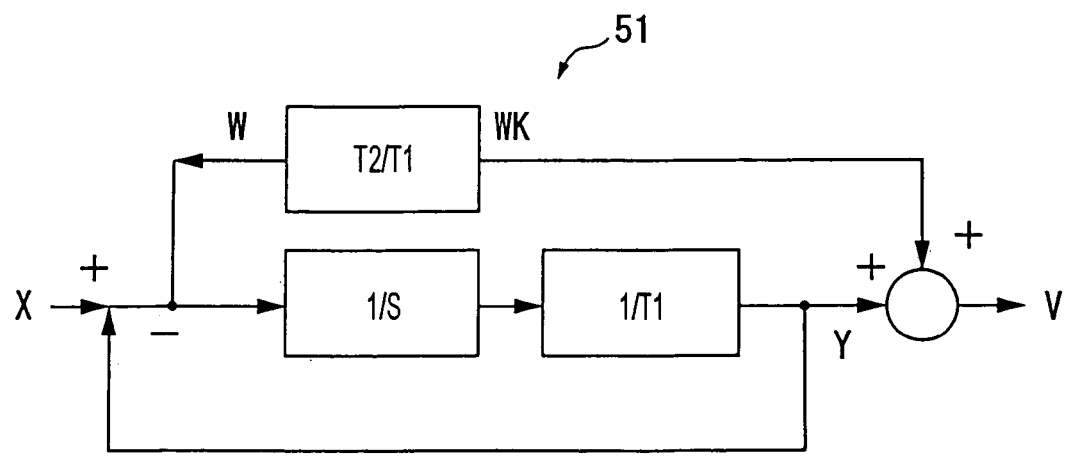
FIG. 7 is a block diagram showing software processing for phase compensation by PID control of the focal detecting means of the aforesaid embodiment.

The focal detecting means 35 also moves the objective lens 3 from the position where the objective lens 3 is detected to the focus position as a zero-cross position in accordance with phase compensation as shown in FIGS. 6 and 7 while continuously recognizing the distance between the objective lens 3 and the zero-cross point.

Specifically, the CPU 41 works as a pair of Proportionality processing and a Proportionality processing 51 for generating signal in proportion to control deviation by software. The CPU 41 also works as an Integration processing 52 generating a signal in proportion to integral value of the software control deviation and a Differentiation processing 53 generating signal in proportion to differential value thereof. The Proportionality processing 50, the Integration processing 52 and the Differentiation processing 53 are operated in parallel. The CPU 41 further works as an adder 54 for combining operation of the Proportionality processing 50, the Integration processing 52 and the Differentiation processing 53. The CPU 41 works as the Proportionality processing 51 after combining operation by the adder 54. After operation as the Proportionality processing 51, the CPU 41 generates a signal generated in proportion to the operation of the Proportionality processing 50, the Integration processing 52 and the Differentiation processing 53 i.e. the control deviation, as a feedback signal. The feedback signal is generated in accordance with formula shown below.

$$u(k) = \left( P2 \times PIe(k) + \frac{1}{Ti}\sum_j Te(j) + \frac{T\alpha}{T}(e(k) - e(k-1)) \right)$$

Ti: Integral time
Ta: Differential time
T: Sampling time
P2: PID control proportional (P) coefficient
1/Ti: PID control proportional (I) coefficient
Ta/T: PID control proportional (D) coefficient Further, the CPU 41 controls the phase compensation shown in FIG. 7 in accordance with the formulae shown below.

W=current X value—previous Y value

Wi=integral of W

Current Y=Wi * coefficient 4 (1/T1)

Wk=W * coefficient 5 (T2/T1)

V=WK+Y * coefficient 6 (1/S→(ΣW)T)

The CPU 41 of the focal detecting means 35 thus conducts PID control and phase compensation control and controls the actuator driver 38 so that the objective lens 3 is moved to the zero-cross point position as the focus position to drive the actuator 12 for focusing.

The PID control circuit 36 is connected to the divider 30 of the signal generator 27. The PID control circuit 36 controls the actuator driver so that the objective lens 3 is moved to the zero-cross point position as the focus position by PID control when focus is lost by, for instance, displacement of the measurement surface 8 in accordance with the movement of the workpiece. Specifically, after completion of focusing by the focal detecting means 35, the controller 25 turns the analog switch 37 from the focal detecting means 35 side to the PID control circuit 36 side for focusing so that the surface of the workpiece as the measurement surface 8 is focused by the PID control circuit 36 by moving the workpiece, thereby measuring the roughness on the workpiece surface. After completion of the focusing process, since there is no great change in the focus error signal, the PBD control by the PID control circuit 36 is conducted to track the focus position.

The laser diode 2, the optical mechanism 4, the first photo detector 21, the second photo detector 22, the drive mechanism 11 and the controller 25 constitute the focusing servo device 55.

[Focusing Process]

Next, the operation of the focusing servo device 55 according to the above-described embodiment will be described below with reference to attached drawings.

Figure 8:
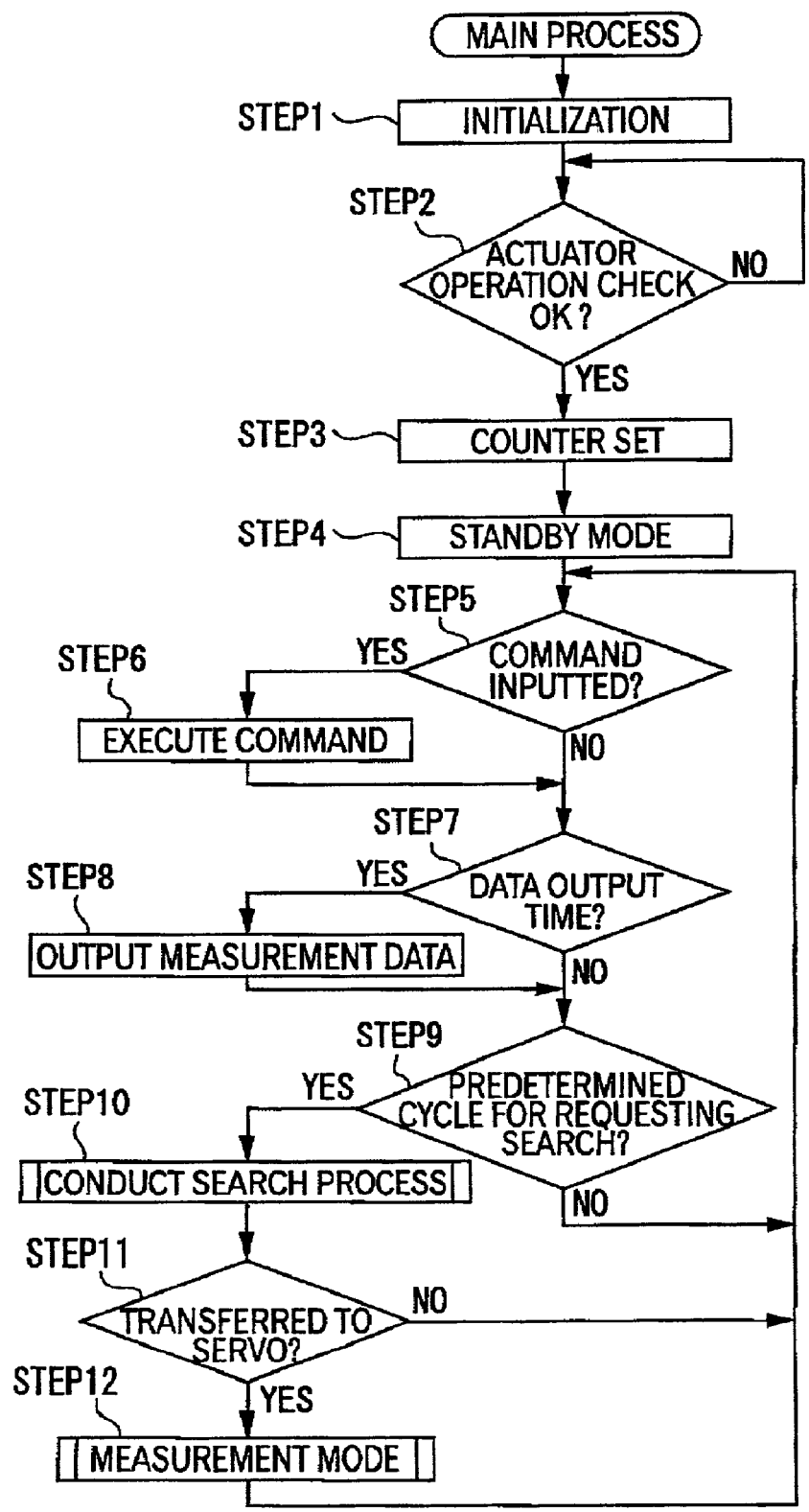
FIG. 8 is a flowchart showing an operation of the focusing servo device of the aforesaid embodiment.
Figure 9:
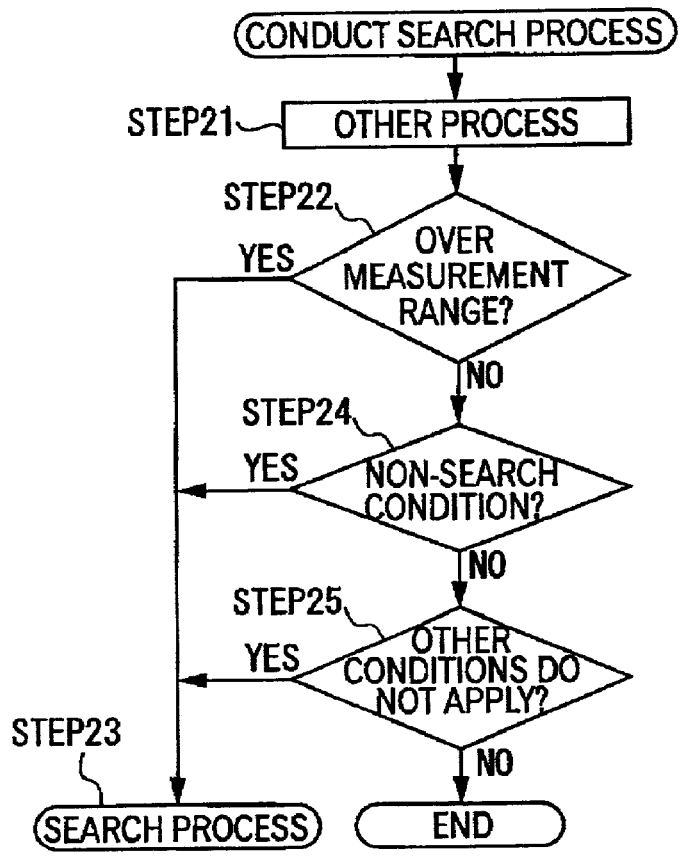
FIG. 9 is a flowchart showing processing routine in starting search process in the aforesaid embodiment.
Figure 10:
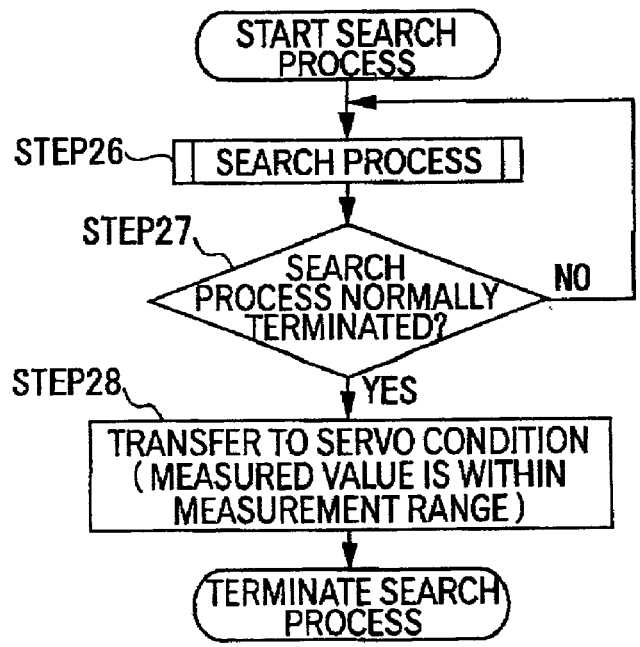
FIG. 10 is a flowchart showing processing routine in conducting search process in the aforesaid embodiment.

According to the specific steps shown in flowcharts of FIGS. 8 to 10, the workpiece detection process for determining the presence of the measurement surface 8 of the workpiece in the focusing servo device 55 is conducted by the optical displacement gauge 1. When the presence of the measurement surface 8 is detected, the focusing servo device 55 conducts focusing process, in which the focus position is determined according to the steps shown in the flowcharts of FIGS. 11 to 14 and the objective lens 3 is moved to the focus position.

Specifically, as shown in FIG. 8, the optical displacement gauge 1 is initialized after being powered on (step 1). The focusing servo device 55 controls the actuator driver 38 by the CPU 41 (step 2) to drive the actuator 12, thereby checking whether a predetermined operation is conducted. When the actuator 12 is normally driven, the focusing servo device 55 stands ready. Subsequently, the counter IC 44 of the focal detecting means 35 is set (step 3) to be standby mode (step 4) waiting for measurement start.

During the standby mode in the step 4, the presence of command input such as input operation by input means provided to the optical displacement gauge 1 is judged (step 5). When the command input is recognized in the step 5, the process corresponding to the inputted command is conducted (step 6).

When the command input is not recognized in the step 5, whether data input time has arrived or not, for instance, a process for outputting previously measured data, currently measuring data, and measuring condition by command input or timer control is initiated or not, is determined (step 7). When the arrival of the data output time is recognized in the step 7, the measurement data etc. is outputted (step 8).

When the data output time has not arrived in the step 7, whether a predetermined cycle for outputting search request has arrived or not is judged (step 9). In the step 9, the central processor 41A of the CPU 41 of the focal detecting means 35 receives signal indicating that a predetermined time, e.g. 250 μs, has elapsed from the TPU 41E through the internal module bus 41B. The number of signal indicating elapse of the 250 μs is counted. When the counted number of the signal reaches a predetermined time, for instance, 800 times to be total 200 ms elapsed time, search process is started. Incidentally, when the predetermined cycle for outputting search request has not been reached in the step 9, standby mode is continued by returning to the step 5.

When the arrival of predetermined cycle for outputting search request is recognized in the step 9, search process, i.e. the focusing process, is started (step 10). In the step 10, after the objective lens 3 is moved to the focus position to terminate the focusing process, whether the condition is transferred to servo condition for measurement or not is determined (step 11). When the servo condition has not been established in the step 11, judging that error has occurred, the standby mode is continued by returning to the step 5. When establishment of the servo condition has been judged in the step 11, the process is transferred to measurement mode for measuring a workpiece (step 12). After terminating the measurement mode in the step 12, the process returns again to the standby mode of the step 5.

Before search process, various processes are conducted as shown in FIG. 9 (step 21). Specifically, error is cancelled when the counter IC is in error state by the movement of the objective lens 3 to a position outside a predetermined range or over speed error caused by abrupt movement of the objective lens 3 on account of external vibration, and initiation warm-up process is conducted.

After termination of various processes in step 21, whether the position of the objective lens 3 is beyond a designated range or not is determined (step 22). When the position of the objective lens 3 is beyond the designated range, search process is conducted by outputting a signal requesting search (step 23) to terminate routine for starting search process.

When the position of the objective lens 3 is not beyond the designated measurement range, whether the device is in non-search condition or not is determined. Specifically, whether more than predetermined focusing error signal S is detected or not is determined by the focal detecting means 35 of the controller 25 (step 24). When more than predetermined focusing error signal S cannot be recognized in the step 24 and the non-search condition is detected, a signal requesting search is outputted to conduct search process in the step 23 and terminates process routine for starting search process.

When a more than predetermined focus error signal S is recognized in the step 24, whether the status meets other condition or not is judged (step 25). Specifically, conditions such as whether the objective lens 3 is not located at the focus position to establish measurement condition of the workpiece currently in servo condition, whether error status such as over-speed error is caused, and whether designated search prohibition time from terminating search process before measuring the next workpiece has not elapsed, are checked.

When the above condition is met in the step 25, the process cannot be transferred to the search process for measuring the workpiece and the process routine for starting search process is terminated. When the above condition is not met in the step 25, the condition for search process is satisfied and the process advances to the step 23.

When the process advances to search process in the step 23, the process routine shown in FIG. 10 is started. Specifically, the controller 25 conducts work detection step and focusing step as the search process based on the signal requesting the search process (step 26).

When the search process is terminated in the step 26, whether the search has normally terminated, i.e. whether the focusing process where the workpiece is detected and focus position is recognized to move the objective lens at the focus position is normally terminated or not is checked (step 27). When the search is not normally terminated, the search process is continued by keeping the search condition back in step the 26. When normal termination of the search is recognized in the step 27, the servo condition is established for measuring the measurement surface 8 of the workpiece (step 28), thereby terminating the process routine for search process.

(Workpiece Detection Step)

In the search process in the step 26, the work detection step is initially conducted. The step 26 is a routine after recognizing arrival of predetermined cycle of 200 ms for requesting search in step 9 and various checks thereafter. The work detection step is controlled by outputting a predetermined signal from the CPU 41 of the focal detecting means 35 from the data bus 42 to the actuator driver 38 through the D/A converter 45. The actuator driver 38 drives the actuator 12 based on the signal from the CPU 41 so that the objective lens 3 is vibrated in a direction along the optical axis.

When the objective lens 3 is vibrated by the focal detecting means 35, the focal detecting means 35 detects the presence of the output of the focus error signal S from the position-shift detecting means 27 by the signal detecting means 46, i.e. the sum component voltage (A+B) constituting the focus error signal S. When the signal detecting means 46 does not detect the output of the focus error signal S, the focal detecting means 35 cannot detect the measurement surface 8 of the workpiece and, judging that the workpiece is not at the measurement position, keeps standby condition before mounting the workpiece at the measurement position. When the signal detecting means 46 detects the output of the focus error signal S, the focal detecting means 35 judges the presence of the workpiece at the measurement position, so that the focal detecting means 35 proceeds from the workpiece detection step to the focusing step.

(Focusing Step)

Figure 11:
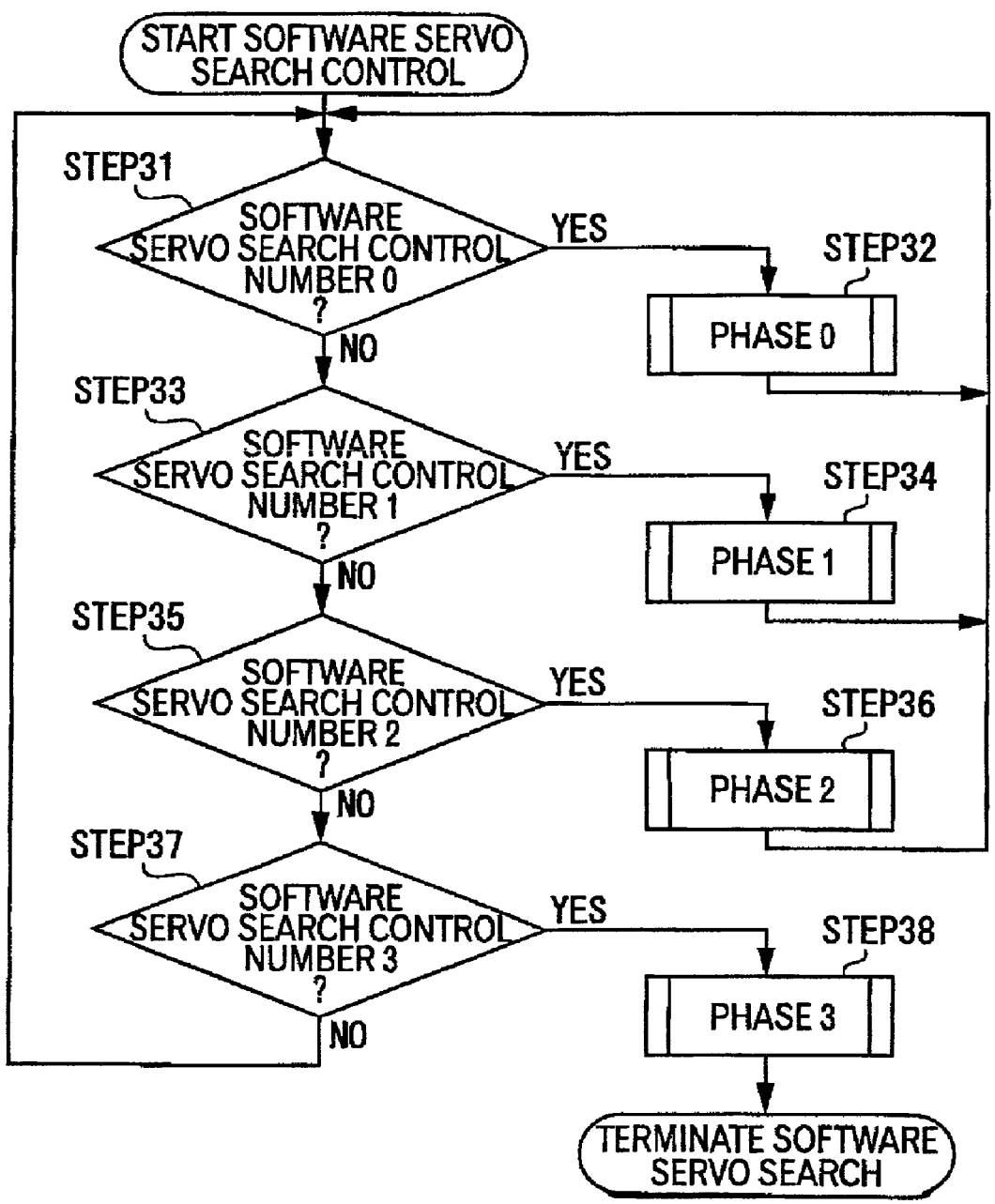
FIG. 11 is a flowchart showing processing routine in conducting search process in the aforesaid embodiment.

In the focusing step after terminating the workpiece detection step, the analog switch 37 of the controller 25 is turned to the focal detecting means 35 side as in the workpiece detection step. Then, the zero-cross point position of the focus error signal S as the focus position of the software servo search shown in FIG. 11 is recognized.

Specifically, whether the process condition of the focal detecting means 35 is control number 0 in which no previous process has been conducted or not is judged (step 31). When the process condition of the focal detecting means 35 is judged as the control number 0 having conducted no process, in order to check stroke of the movement range of the objective lens 3, the objective lens 3 is subjected to phase 0 control where the objective lens 3 is moved downward, i.e. toward the measurement surface 8 (step 32). After conducting the phase 0 control in step 32, the process returns to the step 31.

On the other hand, when the focal detecting means 35 judges that the process is not at the control number 0 in the step 31, whether the process condition of the focal detecting means 35 is control number 1 in which phase 0 process has been conducted in advance or not is judged (step 33). When the process condition of the focal detecting means 35 is judged as the control number 1, in order to check stroke of the movement range of the objective lens 3, the objective lens 3 is subjected to phase 1 control where the objective lens 3 is moved upward, i.e. away from the measurement surface 8 (step 34). After conducting the phase 1 control in the step 32, the process returns to the step 31.

When the control number 1 is not judged in the step 33, whether the process condition of the focal detecting means 35 is control number 2 in which phase 1 process has been conducted in advance or not is judged (step 35). When the process condition of the focal detecting means 35 is judged as the control number 2, the objective lens 3 is subjected to phase 2 control where the objective lens 3 is moved in order to associate the focus error signal S with the position of the objective lens 3 (step 36) and the process returns to the step 31.

When the control number 2 is not judged in the step 35, whether the process condition of the focal detecting means 35 is control number 3 in which phase 2 process has been conducted in advance or not is judged (step 37). When the process condition of the focal detecting means 35 is judged as the control number 3, the objective lens 3 is subjected to phase 3 control where the objective lens 3 is moved to the focus position as the zero-cross point of the focus error signal S (step 38).

After conducting phase 3 control in the step 38, the software servo search control as the focusing control is terminated.

When the control number 3 is not detected in the step 37, suspecting influence of noise etc., the process returns again to the step 31 to repeat the software servo search control as the focusing control. Incidentally, when the servo search control is repeated for a predetermined times, suspecting damage of component, repetition is suspended and error message etc. is displayed or vocalized to announce malfunction.

Figure 12:
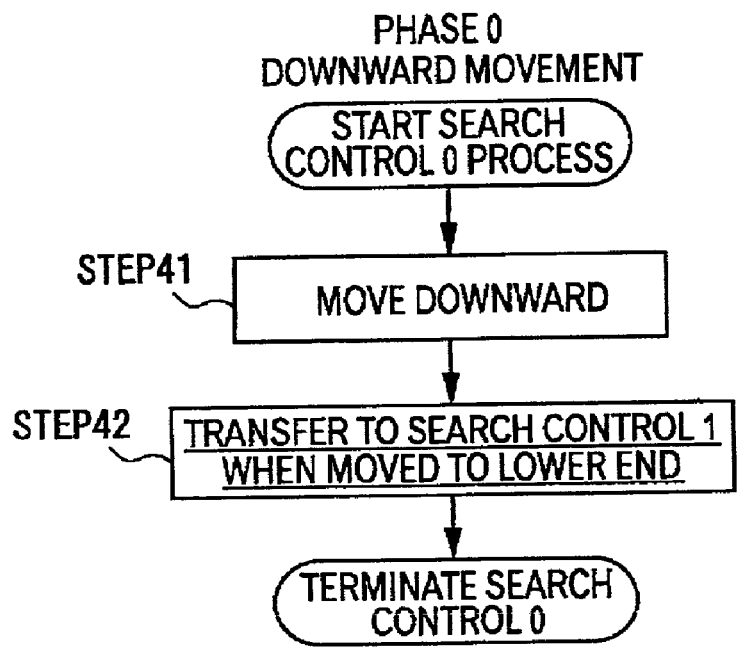
FIG. 12 is a flowchart showing a step for determining lower movement limit in the focusing process of the aforesaid embodiment.

During software servo search control of the focal detecting means 35 of the controller 25, the phase 0 step is initially conducted. In the phase 0, the objective lens 3 is moved downward as shown in FIG. 12 (step 41). The objective lens 3 is moved downward by controllably driving the actuator 12 with PID calculation and phase advancement compensation shown in FIGS. 4 and 7 of the focal detecting means 35 for controlling the actuator 12.

During downward movement of the objective lens 3, the position of the objective lens 3 moving downward is detected by the counter IC 44 to check the lower end thereof. After recognizing the lower end position with the counter IC 44 by moving the objective lens 3 to the lower end in the step 41, the control number 0 indicating completion of the phase 0 is set (step 42) to terminate the phase 0 control.

Figure 13:
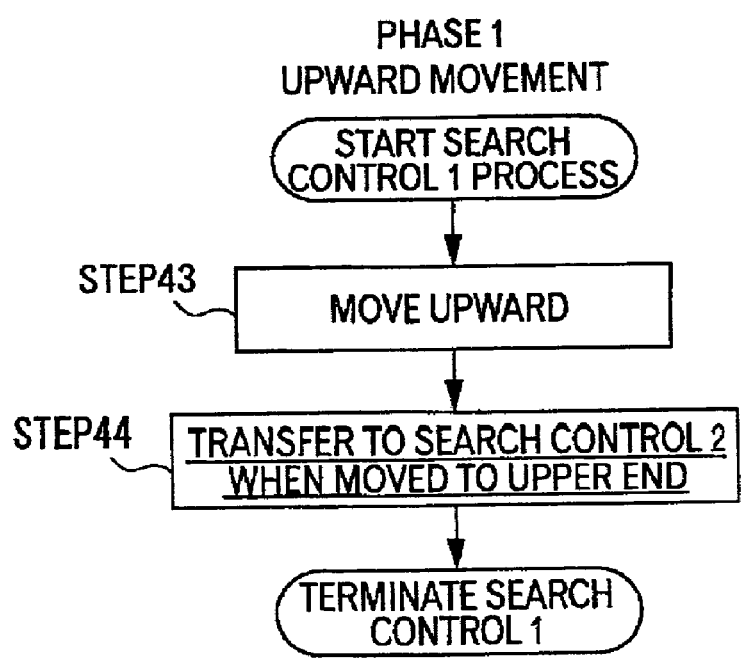
FIG. 13 is a flowchart showing a step for determining upper movement limit in the focusing process of the aforesaid embodiment.

In the phase 1 control, since the movement of the objective lens 3 has been controlled so that the objective lens 3 is situated at the lower end thereof in the phase 0, the objective lens 3 is moved upward as shown in FIG. 13 (step 43). The upward movement of the objective lens 3 is, in the same manner as the phase 0, conducted by controllably driving the actuator 12 with PID calculation and phase advancement compensation shown in FIGS. 4 and 7 of the focal detecting means 35 for controlling the actuator 12.

During upward movement of the objective lens 3, the position of the objective lens 3 moving upward is recognized to check the upper end as in the phase 0 control. When the upper end position is recognized by the counter IC 44 by moving the objective lens 3 to the upper end in the step 43, the control number 2 indicating completion of the phase 1 is set (step 44) to terminate phase 1 control.

Accordingly, during the phase 0 and the phase 1, the objective lens 3 is once moved to the lower end and then to the upper end while detecting position thereof with the counter IC 44, so that the upper limit and lower limit of the movement range of the objective lens 3 can be detected. By recognizing the upper and lower limit, the stroke check for checking the movement range of the objective lens 3 is within a predetermined range, e.g movement range of designed 1 mm is conducted. Incidentally, when a predetermined stroke check cannot be conducted during the phases 0 and 1, the phases 0 and 1 are repeated for a predetermined times. When the predetermined movement range cannot be still recognized, suspecting damage on the component of the actuator 12 etc., error message etc. are displayed and vocalized to announce malfunction.

Figure 14:
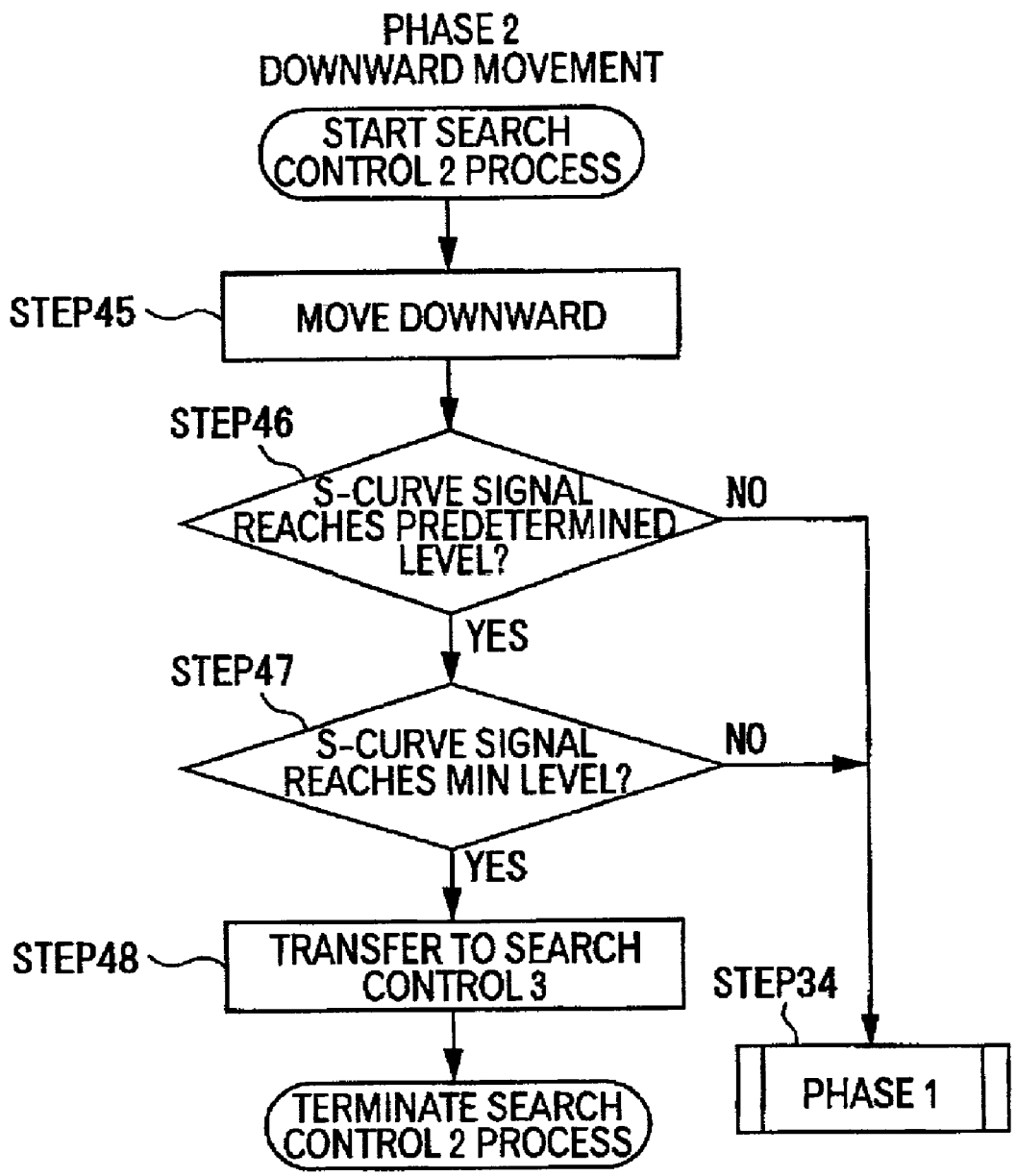
FIG. 14 is a flowchart showing a step for identifying focus error signal in the focusing process of the aforesaid embodiment.
Figure 15:
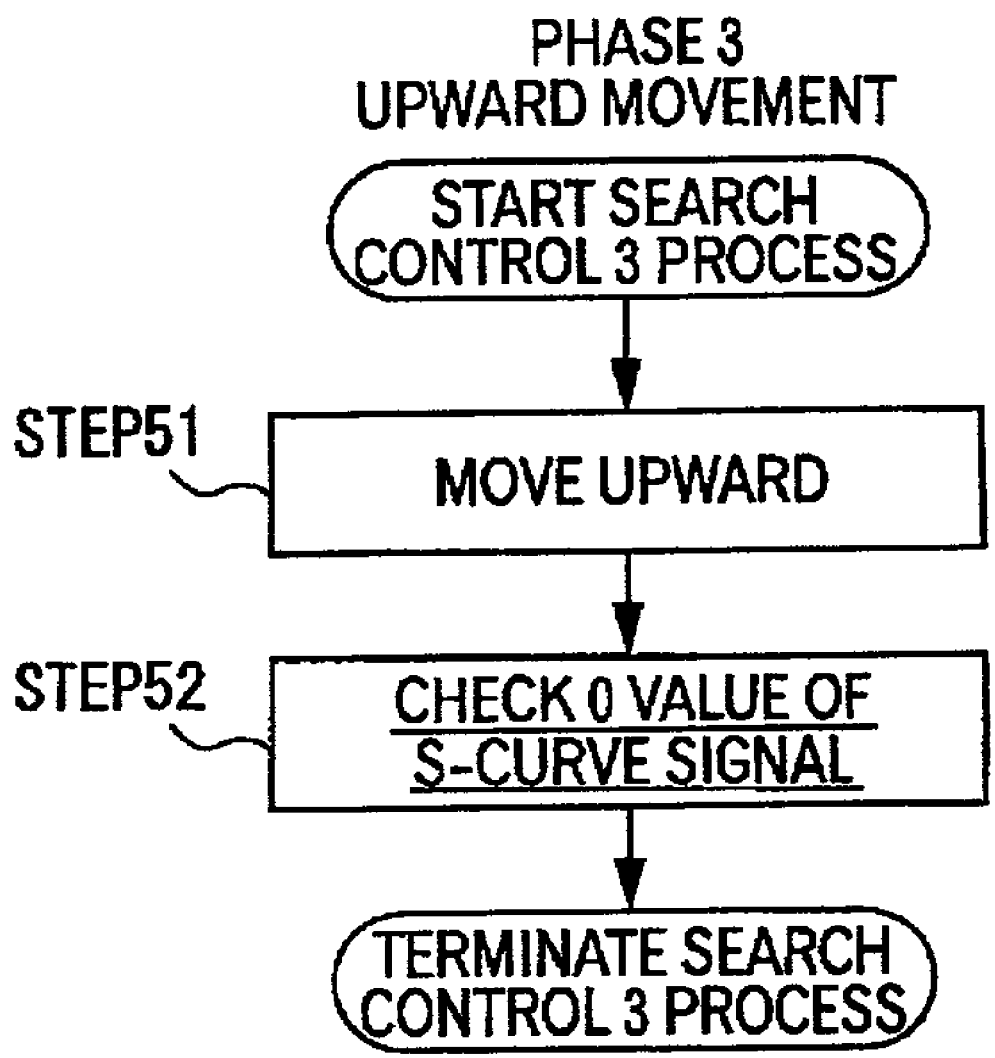
FIG. 15 is a flowchart showing an operation for moving an objective lens to a focus position in the focusing process of the aforesaid embodiment.

In the phase 2 control, the upper limit and lower limit of the movement range 3 is recognized in the phases 0 and 1 and the stroke check has been terminated. In the condition, as shown in FIG. 14, the objective lens 3 is moved downward (step 45). The downward movement is conducted at 200 μm/sec while checking the position of the objective lens 3 with the counter IC 44, during which the focus error signal S outputted by the signal generator 27 is read to associate the position of the objective lens 3 with the focus error signal S. Incidentally, the above movement of the objective lens 3 is conducted by driving the actuator 12 with FID control and phase compensation control as described above.

Subsequently, whether the detected focus error signal S is at a predetermined level or not is determined (step 46). Specifically, according to characteristics of the optical displacement gauge 1, the voltage of the focus error signal S outputted from the signal generator 27 in accordance with the light received by the first photo detector 21 and the second photo detector 22 draws S-curve having, for instance, upper limit of +1.0V and lower limit of −1.0V. Since the objective lens 3 is moved downward from the upper end to the lower end, the voltage of the detected focus error signal S changes from minus value, to zero-cross and plus value as described above. Accordingly, in order to recognize the zero-cross point, whether, not noise, but a predetermined level, i.e. a predetermined magnitude as a threshold value, of minus voltage is detected or not is judged. Incidentally, the predetermined level as the threshold value has been stored in the focal detecting means 35 in advance.

When the predetermined level is detected by the downward movement of the objective lens 3 in the step 46, detection of the focus error signal S is judged and movement of the objective lens 3 for detecting focus error signal S is continued. In other words, the process for associating the focus error signal S with the position of the objective lens 3 by the counter IC 44 is continued. Incidentally, when the objective lens 3 is moved to the lower end without detecting the predetermined level during the downward movement of the objective lens 3 in the step 46, suspecting noise influence etc., the phase 1 control in the step 34 is conducted. In other words, the objective lens 3 is once moved to the upper end in the phase 1 and the predetermined level is again detected in the phase 2.

When the predetermined level is detected in the step 46, whether MIN level, not noise, i.e. a predetermined plus voltage as a predetermined threshold value is detected or not is judged (step 47). Specifically, since the minus voltage of the focus error signal S has been detected in the step 46, when the plus voltage is detected, the zero-cross corresponding to the focus position is located therebetween. Accordingly, after detecting the predetermined level in the step 46, while detecting and associating the focus error signal S with the position of the objective lens 3, the MIN level is recognized in the step 47.

When the MIN level of the focus error signal S is detected in the step 47, the focus error signal S has been read and associated with the position of the objective lens 3, so that the zero-cross of the focus error signal S has been associated at the position of the objective lens 33 by the counter IC 44. Accordingly, the downward movement of the objective lens 3 is stopped and the control number 3 indicating completion of the phase 2 is set (step 48) and terminates the phase 2 control. Specifically, the control for associating the focus error signal S with the position of the objective lens 3 is stopped.

Incidentally, when the MIN level of the focus error signal S cannot be detected in the step 47 and the objective lens 3 reaches the lower end, suspecting noise influence etc, the phase 1 control in the step 34 is conducted. Specifically, the objective lens 3 is once moved to the upper end by the phase 1 and the focus error signal S is associated with the position of the 9 objective lens 3 by the counter IC 44 at the phase 2. When the phase 2 is repeated for a predetermined times, suspecting damage on the component such as the actuator 12, the first photo detector 21 and the second photo detector 22, error message etc. is displayed and vocalized to announce malfunction. Incidentally, the process may not be returned to the phase 1 of the step 34. For instance, the objective lens 3 may be moved to the position of the predetermined level recognized in the step 46 and the detecting process of MIN level may be repeated while associating the focus error signal S with the position of the objective lens 3.

In phase 3, since the focus position has been recognized by associating the zero-cross of the focus error signal S with the position of the objective lens 3, the objective lens is moved to the previously-passed focus position, i.e. upward (step 51). During the upward movement, as described above, the actuator driver 38 is driven to actuate the actuator 12 to move the objective lens 3 upward by controlling the actuator driver 38 while conducting PID control and phase compensation control.

While conducting the PW and phase compensation control, the actuator drive 38 is controlled to drive the actuator 12 and the zero-cross of the focus error signal S is recognized while moving the objective lens 3 upwardly. When the objective lens 3 is moved to the upper end without recognizing the zero-cross, error message etc. is displayed or vocalized to announce, and the focusing control is terminated. When the zero-cross of the focus error signal S is recognized during upward movement of the objective lens in step 51 (step 52), the movement of the objective lens 3 is stopped judging that the objective lens is moved to the focus position and the phase 3 control is terminated to end the focusing control.

According to the conventional arrangement of moving the objective lens 3 to the focus position by feedback control while recognizing the focus position, the objective lens 3 has to be gradually moved while reading the focus error signal S so that the focus error signal S becomes zero-cross, thus lengthening the time for moving the objective lens 3 to the focus position. On the other hand, in the above embodiment, since the objective lens 3 is moved after associating the position of the objective lens 3 with the focus error signal S, the objective lens 3 can be easily and precisely moved to the focus position as compared to the conventional arrangement, thus reducing time and improving operation efficiency.

After the objective lens 3 is moved to the focus position, in other words, after terminating the focusing step and normally terminating search, the servo condition is established, i.e. the analog switch 37 is turned to the PID control circuit 36, the focusing with the moving measurement surface 8 is conducted while conducting PID control, and track control of pickup is conducted. Further, the focus position is recognized by the counter IC 44 to measure the roughness etc. of the measurement surface 8 of the workpiece.

[Advantages of Focusing Servo Device]

According to the focusing servo device of the above embodiment, following advantages can be obtained.

(1) The objective lens 3 is vibrated in a direction along the optical axis by the actuator 12 controlled by the actuator driver 38, and whether the focus error signal S indicating position shift of the objective lens 3 from the focus position is outputted from the position-shift detecting means 27 based on the reflected light reflected by the measurement surface 8 detected by the first photo detector 21 and the second photo detector 22 through the objective lens 3 or not is recognized by the focal detecting means 35. When the output of the focus error signal S is recognized, the focus position is detected based on the focus error signal S. Since the focus position is detected after the objective lens 3 is positively vibrated to recognize the presence of the focus error signal S for detecting the presence of the measurement surface 8 of a workpiece, the focus error signal S can be easily recognized even when the objective lens 3 is shifted from the focus position in a pinhole method having relatively narrow wave width of the focus error signal S, so that the presence of the measurement surface 8 can be easily and automatically determined for automatic focusing. Since the objective lens 3 is vibrated, even when vibration is applied by impact from the outside, suspending function for, for instance, over-speed error processing works, so that focusing process failure can be prevented. Since the objective lens 3 is vibrated by the actuator 12 for moving the objective lens 3, no other component is necessary for recognizing the presence of the measurement surface 8, so that the arrangement can be simplified and increase in size can be prevented, thus measuring the workpiece irrespective of the size and shape of the workpiece and enhancing applicability.

(2) The actuator 12 driven by the actuator driver 38 is provided as a driver for moving the objective lens 3 and the trigger signal is outputted to the actuator 12 to vibrate the objective lens 3 in a direction along the optical axis. Accordingly, an arrangement for moving and vibrating the objective lens 3 can be easily obtained.

(3) The actuator 12 is driven to vibrate the objective lens 3 in a direction along the optical axis in a periodical manner by the focal detecting means 35. Since the presence of the focus error signal S is periodically recognized and the presence of the measurement surface 8 is recognized, automatic and efficient focusing is possible for focusing on an article automatically conveyed.

(4) When the focus error signal S is recognized in vibrating the objective lens 3 by the focal detecting means 35, the actuator 12 is driven to move the objective lens 3 and the focus position is recognized based on the focus error signal S from the position-shift detecting means 27 and the position of the objective lens 3 detected by the position detecting means 49, and the objective lens 3 is moved to the recognized focus position. Accordingly, in recognizing the focus position by detecting the focus error signal S, the position of the objective lens 3 is detected to recognize the focus position from the focus error signal S, and then the objective lens 3 is moved to the focus position. Unlike the conventional arrangement, there is no need for feedback control while checking the position of the objective lens 3 in moving the objective lens 3 to the focus position. Therefore, after detecting the focus position by recognizing the presence of the measurement surface 8 of the workpiece, the objective lens 3 can be moved at a high speed, so that the objective lens 3 can be moved to the focus position within a short time, thereby improving focusing efficiency.

(5) The focus position is detected by the focal detecting means 35 based on the focus error signal S indicating position shift of the objective lens 3 from the focus position on the basis of the reflected light reflected by the measurement surface received by the pair of the first photo detector 21 and the second photo detector 22 through the objective lens 3 and the position of the objective lens 3 detected by the position detecting means 49, and the objective lens 3 is moved to the focus position. Accordingly, the position of the objective lens 3 is recognized during the operation for detecting focus position by detecting the focus error signal S, and, after detecting the focus position, the objective lens 3 is moved to the focus position. Accordingly, the objective lens 3 can be easily moved to the focus position within a short time as compared to a conventional arrangement for gradually moving the objective lens 3 while reading the focus error signal S to recognize the position where the focus error signal S becomes zero-cross to detect the focus position and stop the objective lens at the position, thereby improving operation efficiency. Further, only the counter IC 44 of the position detecting means 49 used for tracking the focus position by the PID control circuit 36 is used and no special component is necessary, so that the objective lens 3 can be moved to the focus position within a short time.

(6) The movement range of the objective lens 3 is recognized by moving the objective lens 3 to positions most adjacent to and most remote from the measurement surface by the focal detecting means 35, and the focus position is detected by detecting the focus error signal S from the signal generator 27 while the position of the objective lens 3 is detected within the movable range of the objective lens 3. Accordingly, the focus position can be easily and accurately detected.

(7) The objective lens 3 is moved to the focus position detected by the PID control and phase compensation control by the focal detecting means 35. Accordingly, the objective lens 3 can be accurately moved to the focus position without causing delay and excessive movement of the objective lens 3 using conventionally established control method and control structure can be simplified.

(8) In associating the focus error signal S with the objective lens 3 in phase 2, the objective lens is moved from the most remote upper end to lower direction, i.e. in a direction toward the measurement surface 8, and the focus error signal S is read while being associated with the position of the objective lens 3 to recognize the predetermined minus voltage as the predetermined level of the focus error signal S and, subsequently, the predetermined plus voltage is detected. Thus, the zero-cross of the focus error signal S is associated with the position of the objective lens 3 and the focus position can be easily detected.

(9) Since the focus position has been detected when the MIN level is detected after recognizing the predetermined level, no further association of the focus error signal S with the position of the objective lens 3 is necessary, so that the movement of the objective lens 3 is stopped and the objective lens is moved to the focus position by transferring to the next phase 3. Accordingly, the objective lens 3 has passed zero-cross position as the focus position when the minimum value of the focus error signal S is recognized, so that it is not necessary to move the objective lens 3 to the position of the lower end and the objective lens 3 can be moved to the focus position within a short time.

(10) Since the focus position is recognized by moving the objective lens 3 downward after recognizing the movable range by moving the objective lens downward once and then upward, there is no need for temporarily moving the objective lens 3 in order to recognize the focus position. Therefore, immediately after recognizing the movable range, the process for recognizing the focus position by associating the focus error signal S with the position of the objective lens 3 can be conducted, so that the objective lens can be easily and efficiently moved to the focus position, thus moving the objective lens 3 to the focus position within a short time.

[Other Embodiment]

Incidentally, the scope of the present invention is not restricted to the above-described embodiment, but includes following modifications as long as an object of the present invention can be achieved.

Any method can be used for focusing as long as the focus error signal S is detected by vibrating the objective lens.

Though the focus error signal S from the signal generator 27 is detected by pinhole method based on the light received by the first photo detector 21 and the second photo detector 22, any method may be used for detecting the focus error signal such as knife-edge method.

Incidentally, in the knife-edge method, the focus error signal S becomes 0 when the measurement surface 8 coincides with the focus position of the objective lens 3 and becomes plus when the objective lens 3 is near the measurement surface 8 relative to the focus position of the objective lens 3. On the other hand, though the focus error signal S becomes minus when the objective lens 3 is situated remote from the measurement surface 8, plus and minus is inverted when the measurement surface 8 is situated further remote from the focus position of the objective lens 3 to be plus. When the measurement surface 8 is moved further remote from the focus position, the plus value becomes small to be near 0. Accordingly, the focus error signal S takes plus value at two areas and minus value at one area. When the focus position is the most adjacent to the measurement surface, the plus value becomes small near 0. Incidentally, the plus value area where the measurement surface is near the focus position has greater maximum value than the plus value area remote from the focus position. Accordingly, the focus position as the zero-cross position can be detected while being associated with the position of the objective lens 3 in accordance with the characteristics of the focus error signal S.

The focus error signal S may not be read by the pinhole method or the knife-edge method as in the above-described embodiment, but may be applied in the same manner when the plus and minus are reverse.

Though the position-shift detecting means uses the subtractor 28, the adder 29 and the divider 30, the focus error signal S may be obtained in any manner.

Further, though the focus error signal S is obtained by the pair of first photo detector 21 and the second photo detector 22, the number is not restricted to a pair but may be more than two.

The driver is not restricted to the actuator 12 but any arrangement is possible as long as the objective lens 3 can be moved along the optical axis.

The position of the moving objective lens 3 is detected by counting the two-phase square wave signal from the linear encoder 15 with the counter IC 44, the position may be detected in any other manner.

The objective lens 3 may be moved to the focus position detected by the focal detecting means 35 not by the PID control and the phase compensation control but may be moved to the focus position in any manner such as directly recognizing the focus position without detecting the position of the objective lens and feedback control.

The analog switch 37 may not be electrical switch of electrical component such as a transistor, but may be mechanical switch.

The present invention can be applied not only for tracking control of pickup of an optical disc driver or a surface roughness gauge but may be applied to any optical displacement gauge.

Though the predetermined level and MIN level are recognized for detecting the focus position and the operation is repeated when the recognition is failed in the above embodiment, the arrangement is not limiting but error message may be announced by interrupting the process when the required signal level cannot be detected. Further, though the predetermined level and the MIN level are sequentially detected by moving the objective lens from the position the most remote from the measurement surface 8 in detecting the focus position in the above embodiment, the MIN level and the predetermined level may be sequentially detected by moving the objective lens 3 from the nearest position in a direction to be away from the measurement surface 8.

Though the workpiece detection step by vibrating the driver, and focusing step based on the focus error signal and the position signal of the objective lens from the position detecting means are conducted as the focusing process, the present invention includes utilization of the position signal of the objective lens without conducting vibrating-type workpiece detection.

Figure 16:
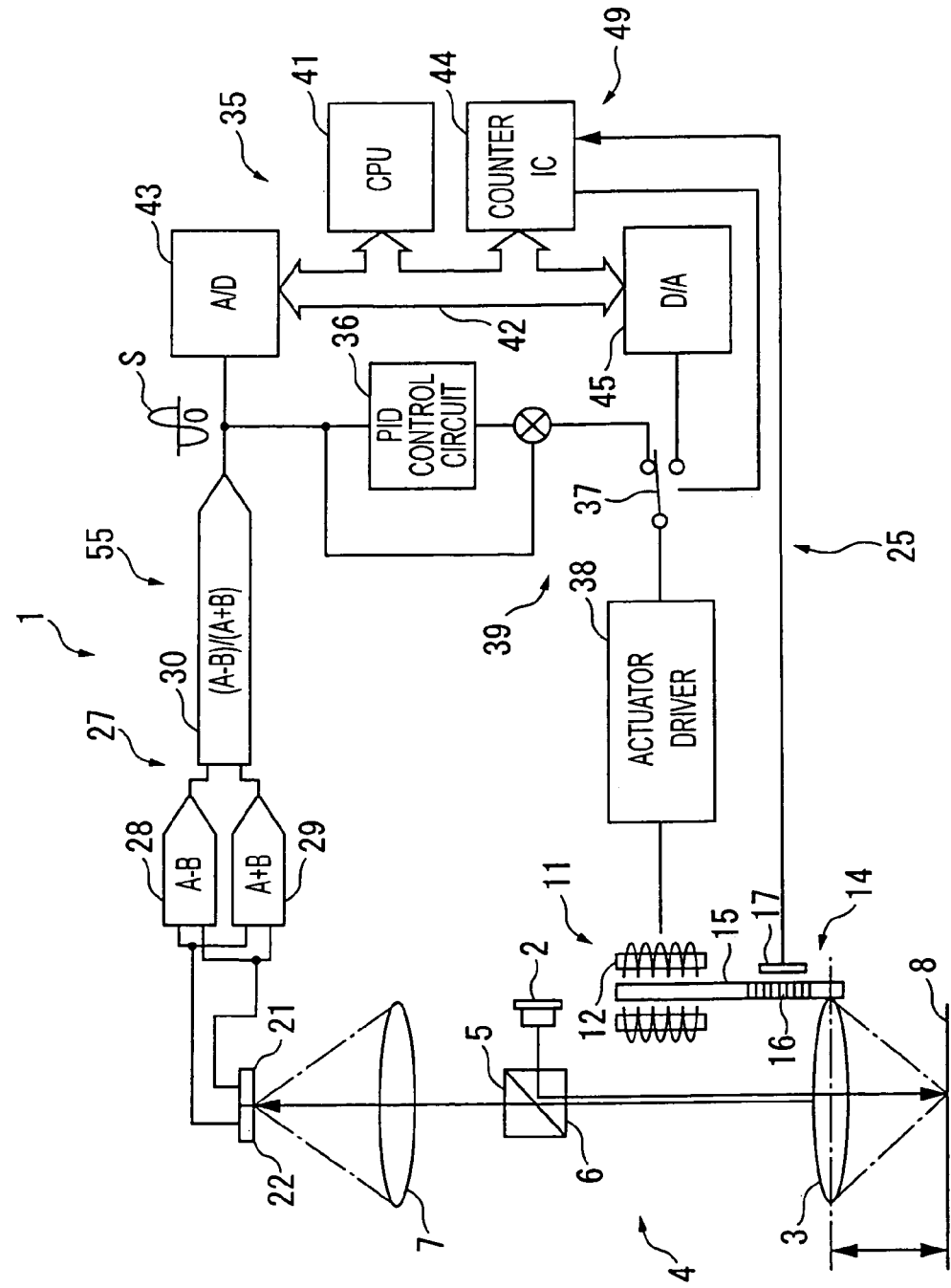
FIG. 16 is a block diagram showing an optical displacement gauge using a focusing servo device according to another embodiment of the present invention.
Figure 17:
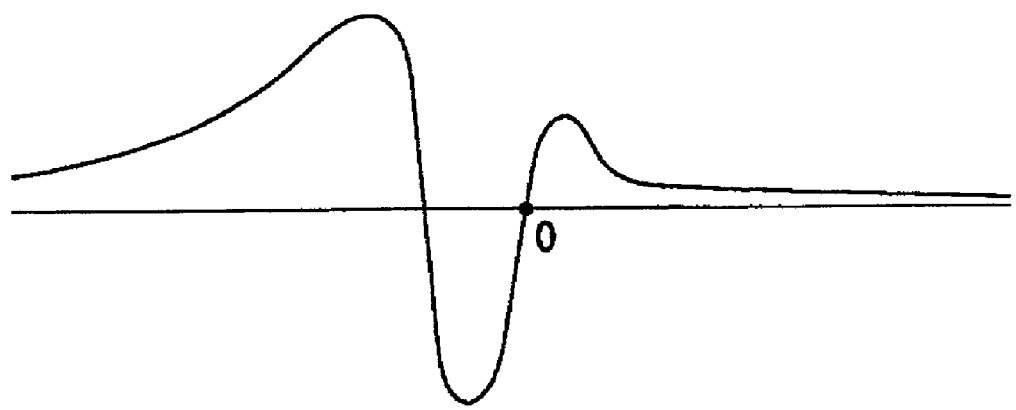
FIG. 17 is a graph showing a focus error signal of a knife-edge type focusing servo device of a conventional art.

For instance, the arrangement shown in FIG. 16 has no signal detecting means 46 (S-curve detecting means 47 and the I/O 48) in the above-described arrangement shown in FIG. 1, the above-described advantages of (5) to (10) can be obtained by conducting the operation described in the FIGS. 11 to 15.

The other arrangement and process in implementing the present invention may be arranged the other way as long as an object of the present invention can be achieved.

What is claimed is:

1. A focusing servo device, comprising:
   a driver for moving an objective lens along the optical axis of the objective lens, the objective lens irradiating a light beam onto a measurement surface and receives reflected light reflected by the measurement surface;
   a plurality of photo detectors mutually opposed on both sides of the optical axis of the objective lens as a symmetry axis for respectively detecting the reflected light from the objective lens;
   a position-shift detector for outputting a focus error signal indicating position shift of the objective lens from a focus position based on the reflected light respectively detected by the plurality of photo detectors;
   a position detector for detecting the position of the objective lens moved by the driver, the position detector outputting the position of the objective lens as a counted value; and
   a focal detector for recognizing the focus position based on the focus error signal from the position-shift detector and the position of the objective lens detected by the position detector and for actuating the driver to move the objective lens to the focus position,
   wherein the focal detector moves the objective lens to a position most adjacent to the measurement surface and to a position most remote from the measurement surface to detect a movable range of the objective lens, and
   while moving the objective lens within the movable range, the focal detector recognizes the counted value indicating a position of the objective lens when the focus error signal indicates a zero-cross point as the focus position, and after recognizing the counted value, the focal detector moves the objective lens to the previously passed focus position recognized as the counted value.

2. A focusing servo device, comprising:
   a driver for moving an objective lens along the optical axis of the objective lens, the objective lens irradiating a light beam onto a measurement surface and receives reflected light reflected by the measurement surface;
   a plurality of photo detectors mutually opposed on both sides of the optical axis of the objective lens as a symmetry axis for respectively detecting the reflected light from the objective lens;
   a position-shift detector for outputting a focus error signal indicating position shift of the objective lens from a focus position based on the reflected light respectively detected by the plurality of photo detectors;
   a focal detector for controllably actuating the driver to vibrate the objective lens along the optical axis to recognize presence of the focus error signal outputted from the position-shift detector and detecting the focus position based on the focus error signal by recognizing the output of the focus error signal; and
   a position detecting means for detecting the position of the objective lens,
   wherein the focal detector moves the objective lens to a position most adjacent to the measurement surface and to a position most remote from the measurement surface to detect a movable range of the objective lens, and
   while moving the objective lens within the movable range, the focal detector recognizes a counted value indicating a position of the objective lens when the focus error signal indicates a zero-cross point as the focus position, and after recognizing the counted value, the focal detector moves the objective lens to the previously passed focus position recognized as the counted value.

3. The focusing servo device according to claim 2, wherein the driver has an actuator, and the focal detector outputs a trigger signal to the actuator to vibrate the objective lens in a direction along the optical axis.

4. The focusing servo device according to claim 2, wherein the focal detector periodically controls the driver to vibrate the objective lens in a direction along the optical axis.

5. A focusing servo method, comprising:
   irradiating a light beam onto a measurement surface;
   receiving a reflected light reflected by the measurement surface through an objective lens;
   detecting a focus position by detecting a focus error signal indicating deviation of the position of the objective lens relative to the focus position based on the amount of the reflected light; and
   moving the objective lens to the detected focus position along the optical axis of the objective lens;
   wherein detecting a focus position includes moving the objective lens to a position most adjacent to the measurement surface and to a position most remote from the measurement surface to detect a movable range of the objective lens, and
   while moving the objective lens within the movable range, recognizing a counted value indicating a position of the objective lens when the focus error signal indicates a zero-cross point as the focus position, and after recognizing the counted value, moving the objective lens to the focus position recognized as the counted value.

6. The focusing servo method according to claim 5, wherein an actuator is used for moving the objective lens and the objective lens is vibrated in a direction along the optical axis by outputting a trigger signal to the actuator.

7. The focusing servo method according to claim 5, wherein the objective lens is periodically vibrated in the direction along the optical axis.

* * * * *